Dec. 29, 1931.  J. L. ANDERSON ET AL  1,839,170
TEMPLATE CONTROLLED APPARATUS
Filed July 10, 1930  3 Sheets-Sheet 1
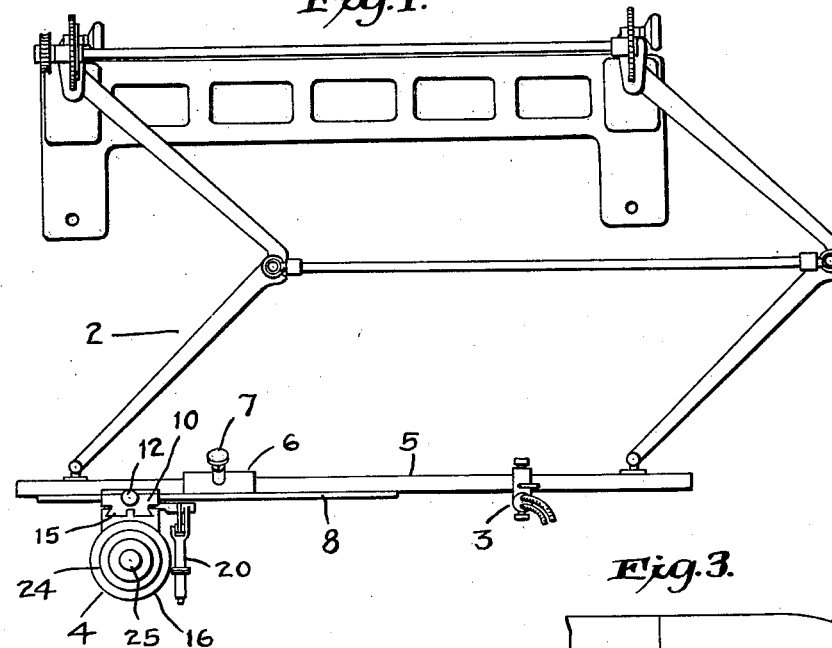
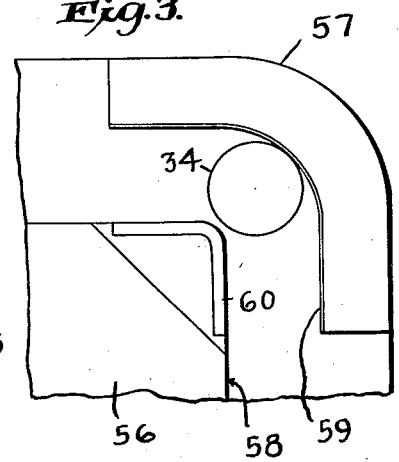
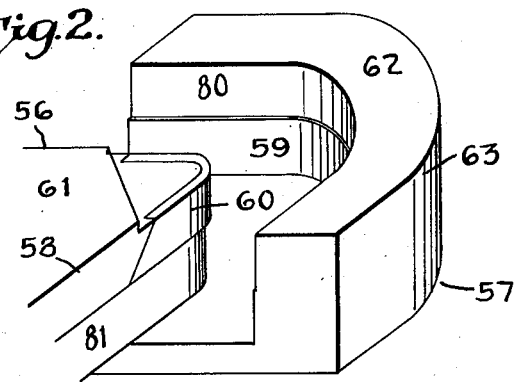

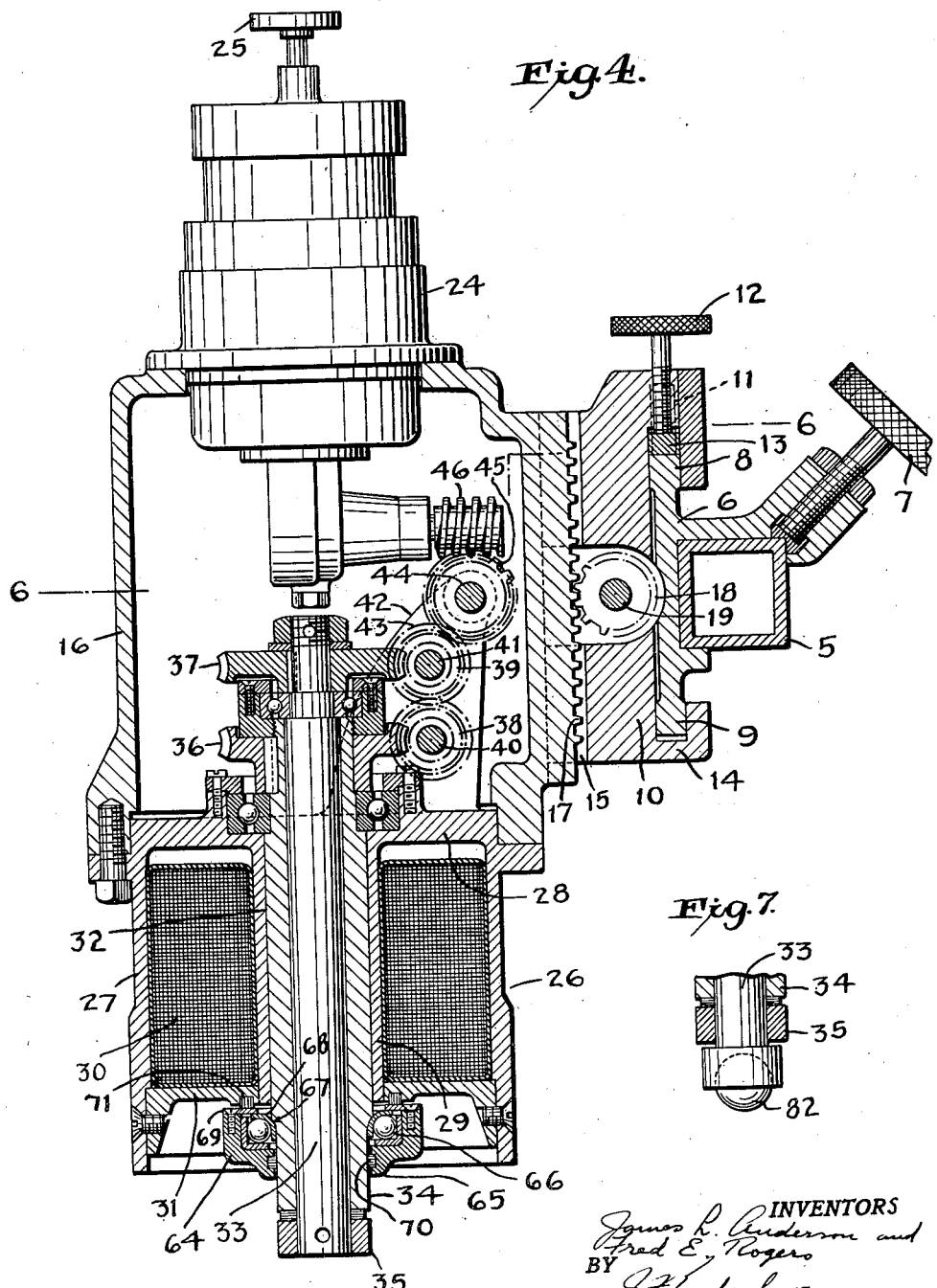

Dec. 29, 1931.   J. L. ANDERSON ET AL   1,839,170
TEMPLATE CONTROLLED APPARATUS
Filed July 10, 1930    3 Sheets-Sheet 3
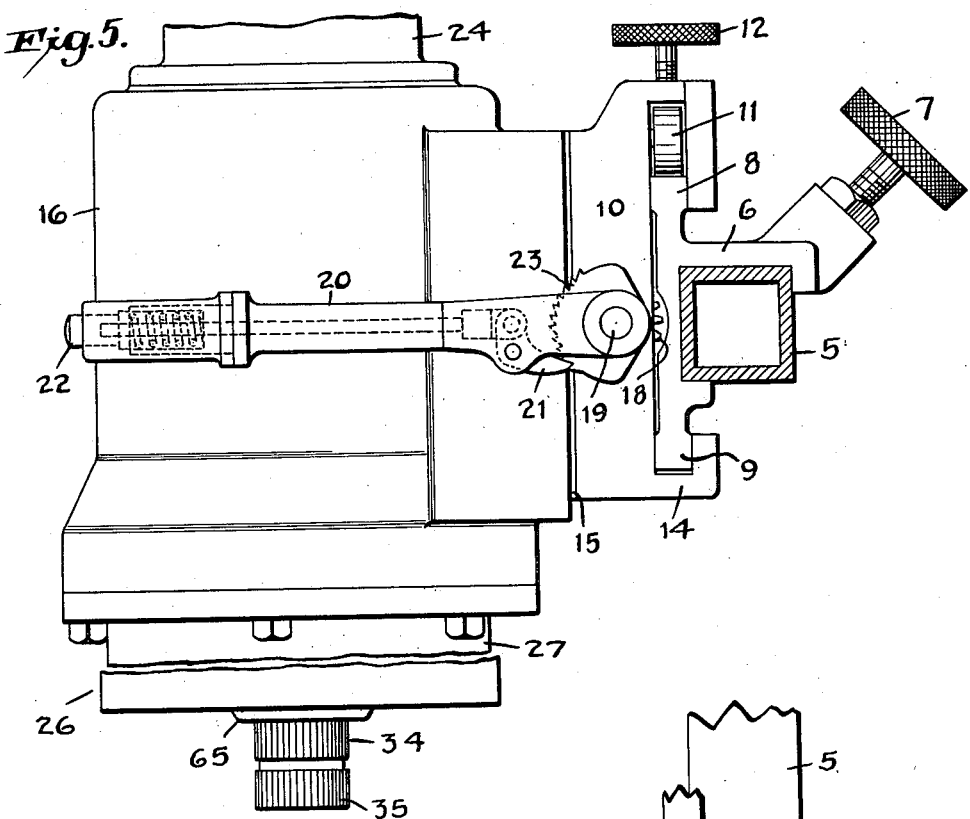
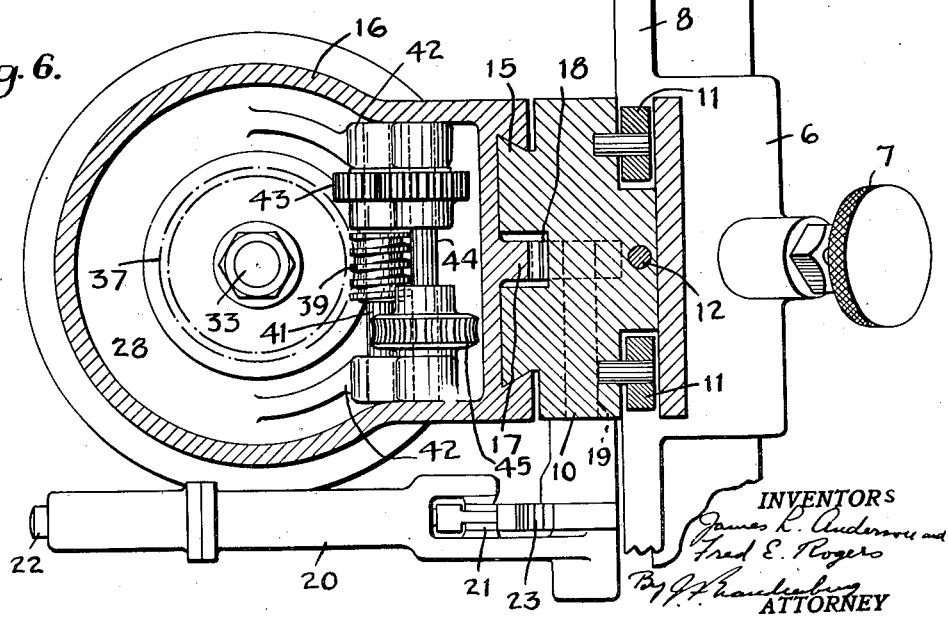

Patented Dec. 29, 1931

1,839,170

UNITED STATES PATENT OFFICE

JAMES L. ANDERSON, OF TENAFLY, AND FRED E. ROGERS, OF EAST ORANGE, NEW JERSEY, ASSIGNORS TO AIR REDUCTION COMPANY, INCORPORATED, OF NEW YORK, N. Y., A CORPORATION OF NEW YORK

TEMPLATE CONTROLLED APPARATUS

Application filed July 10, 1930. Serial No. 467,121.

Magnetic tracer apparatus whereby a cutting-torch carried by a universal-movement frame is caused to execute any desired shape of cut from a template to the boundary of which a driven magnet roller adheres, is known from Patents Nos. 1,352,760, 1,324,007 and 1,365,021.

The object of this invention is to provide an improved tracer or follower of this type, as well as advantageous features and combinations in the apparatus of which the tracer forms a part. An advantage of the improved tracer is that it is capable of following practically any course of changing direction without interruption of motion or manual intervention. With this tracer it is possible to control the movement of the torch or other instrumentality so as to turn sharper corners, or otherwise to control the movement more conveniently or to enable the controlled instrumentality to be directed automatically through certain courses which would ordinarily be difficult to realize or would have to be approximated. To these ends we have devised a magnetic tracer having two template rollers which are driven in contrary directions.

A further object of the invention is to provide novel template means to cooperate with such a follower in a manner to secure advantages such as indicated. An important feature of the template means is that it utilizes a combination of internal and external templates, or template parts, the internal template being designed to cooperate with one of the magnet rollers over part of the course and the external template being designed to cooperate with the other magnet roller over another part of the course, the control of the movement being automatically transferred from the internal template to the external template or vice-versa.

Another object of the invention is to provide a magnetic tracer employing rollers only one of which is active at any one time for driving but is assisted in its magnetic tractive force by the idly turning roller or rollers.

Another object is to reduce the drag or resistance due to vertically acting weight applied by the tracer to the template or other supporting surface, while preferably utilizing this weight to assist in keeping the magnetic driving roller against the side of the template.

Another object is to secure a downward pressure of a definite and uniform magnitude calculated to insure firm adherence of the roller to the side of the template without creating undue drag.

Other features of novelty will become apparent to those skilled in the art or will be indicated hereinafter.

In the accompanying drawings, forming part hereof:

Fig. 1 is a plan view of an illustrative apparatus employing the improved magnetic tracer;

Fig. 2 is a perspective view of a portion of a template arrangement designed to cause the torch or other controlled instrumentality to turn a substantially sharp corner;

Fig. 3 is a plan view of Fig. 2, indicating the circle of the alined rollers;

Fig. 4 is a vertical section on a larger scale, taken on the line 4—4 of Fig. 1, parts being left in elevation;

Fig. 5 is a side elevation of the tracer unit and its mounting, with portions broken away;

Fig. 6 is a horizontal section taken on the line 6—6 of Fig. 4; and

Fig. 7 is a fragmentary view illustrating a modification.

The frame 2 of known type shown in Fig. 1 is representative of any suitable form of universal-motion, or motion-reproducing, frame, of which various kinds are known. A cutting torch 3 and a follower 4 mounted on the front bar 5 of the jointed frame are movable in all directions in a plane, more especially a horizontal plane, and in this particular form of apparatus the movements of the follower and of the controlled instrumentality are substantially the same in direction and in rate, but this is not essential.

The follower is shown connected with a bracket 6 secured to the bar 5 by a set-screw 7. This bracket may be provided with upper and lower flange-ways 8 and 9 extending for suitable distances lengthwise of the bar, for convenient shifting of the follower to different positions on the bar. In that connection, a mounting 10 is made to embrace the ways and is provided with wheels 11 to roll on the upper way, and with a locking screw 12 and shoe 13 to bear on this way and draw the under jaw 14 of the mounting up against the lower way, when the mounting is to be fixed on the bar.

The mounting 10 has a dovetail or other vertical guide 15, on which a hollow frame 16, forming part of the follower unit, is vertically movable. The follower unit can be readily raised and lowered, and can be supported at any desired elevation, clear of parts beneath, when not in operation, preferably by the following means.

The frame 16 has a vertical rack 17 which is meshed by a pinion 18 on a shaft 19 journaled in the mounting 10. A hand-lever 20 is fixed to the outer end of this shaft and has a spring-pressed dog 21 retractible by pressure on a button 22 in the hand grip, this dog cooperating with a relatively stationary ratchet 23 to sustain the follower at any desired height.

In operation, the weight of the follower, its magnet and driving means, rests on the template, as will hereinafter appear, and the follower is free to float vertically on the mounting and relatively to the frame as the follower proceeds along or around the template. The vertical range within which the follower need float is not great, and the toothing of the ratchet should be coarse enough not to interfere with this action.

Secured in the upper end of the frame 16 is an electric motor 24 having an adjustable speed governor, represented by the knob 25.

Fixed to the lower end of the frame is a magnet frame 26, this frame comprising a casing 27, a head 28 and a core 29, all of magnetic material. The coil of the magnet is marked 30, and 31 is a bottom closure of non-magnetic material.

A hollow shaft 32 and an inner shaft 33 pass vertically through and form part of the core of the electro-magnet, and the protruding lower end 34 of the hollow shaft constitutes one of the template rollers. The inner shaft extends below the hollow shaft, and to its end is fixed the other template roller 35. The two rollers form a polar portion of the magnet.

These shafts extend upward different distances within the casing 16 and carry worm-wheels 36 and 37, and these are meshed by worms 38 and 39 on transverse shafts 40 and 41 journaled in brackets 42.

A train of spur gears 43 connects the shafts 40 and 41 with each other and with another shaft 44, the latter having a worm-wheel 45 which is meshed by a worm 46 driven by the motor 24, the gearing being such that the shafts 32 and 33 and their template rollers are driven in opposite directions. Thus, if the roller 34 is viewed as rotating clockwise, the roller 35 will be seen to rotate counter-clockwise.

A partial illustration of the kind of template means which it is advantageous to employ with such a magnetic follower is contained in Figs. 2 and 3. The arrangement represented is for the cutting of a corner having the least radius of curvature. For general purposes an external template, that is to say one to the outer boundary of which the magnet roller adheres as it rolls along the boundary, is desirable, but when a roller turns a corner of such a template the torch describes an arc of comparatively large radius. Under the present invention, this difficulty can be overcome, and very nearly sharp corners can be cut, by combining with the main, external template 56 of magnetic material an internal template 57, also of magnetic material, for guiding the follower through the abrupt change in direction. The magnet roller 34 will operate on the boundary 58 of the template 56, whereas the magnet roller 35 will operate in a different plane, or lower level, on the inner boundary of the template 57. The surfaces are so disposed that at the moment when the roller 34 is no longer held by magnetic attraction against the track 58, the roller 35 comes into magnetic engagement with the track 59, and vice-versa. The corner of the template 56 may be omitted entirely, or it may have a non-magnetic facing 60.

By such a plan uninterrupted movement of the follower is secured, the control being automatically transferred from one template to the other and back again, one of the two oppositely driven rollers being the driver through one or more parts of the course, and the other roller being the driver in the remainder of the course. This general plan can be utilized for causing the instrumentality 3 to execute various desired movements more satisfactorily or more exactly than they could be produced with a single template and a single magnet roller, and this part of the invention is not limited, therefore, to the example given.

The two templates, or template parts 56 and 57 have top supporting surfaces 61 and 62 in the same plane, except that the top of the template 56 is relieved at the corner.

It will be observed that the portion 80 of the side wall of the template 63 above the track 59 is relieved or cut back sufficiently to provide a clearance between it and the upper roller 34 which turns idly while the lower roller 35 propels the tracer. Nevertheless, the magnetic lines of force proceeding from the upper roller across the air gap to the opposed wall of the template increases the magnetic traction of the roller 35 through this part of the course. Similarly, the part 81 of the wall of the template 56 below the track 58 is preferably cut back only sufficiently to clear the lower roller 35 in that part of the course through which the tracer is propelled by the traction of the roller 34 against the track 58.

It is decidedly advantageous to provide non-magnetic insertions, such as the insertion 60, in the track boundaries of the template or templates at regions where the control is transferred from one roller and track to the other roller and track, and by tapering the ends of such insertions as illustrated in Fig. 2 the magnetic attraction between the roller and its track can be gradually increased or increased in a manner to insure uninterrupted motion from one operating surface to the other.

Means of an anti-friction character are provided for resting the weight of the floating follower unit on one or other of these surfaces 61 and 62. In Patent 1,352,760 an overhanging shoulder of the template roller was used to apply part of the weight of the frame to the top of the template, and the friction between this shoulder and the top of the template had in itself an influence which aided in keeping the periphery of the roller against the wall of the template. In the present apparatus, the follower unit does not sustain the weight of the frame, and its own considerable weight is applied to the template in a manner to minimize frictional drag, the objects being to insure smooth progress and to require only a moderate amount of electrical energy for driving the apparatus.

For these purposes, the follower is preferably provided with a collar 64 just above the protruding portion of the hollow shaft 32, which constitutes the roller 34, this collar being free to turn idly with respect to both rollers and with respect to the body of the magnet. The narrow annular lower extremity 65 of this collar is the portion designed to bear on top of the template. The collar is preferably of non-magnetic material.

A ball-bearing 66 is interposed between the collar and a shoulder 67 of the shaft 34. The upper raceway 68 of this bearing is fixed to the shaft, and a ring 69 screwed to the top of the collar and extending inward over said raceway holds the collar and ball-bearing in assembly on the shaft. Dust rings 70 and 71 may be interposed between the lower part of the collar 64 and the shaft 34 and between the top of the collar and the closure plate 31 of the magnet.

While this collar reduces the drag or resistance to propulsion, the weight which is applied to the top of the template has an effect to cause the magnetic roller to hug the side of the template even more securely than it would otherwise, this being due to a tendency of the follower to turn or fulcrum about the point of application of vertical pressure, which it can not do and which consequently results in an increased side pressure. The tracer unit being free to float vertically relatively to the universally movable frame 2, the weight thus applied is constant, and the mass of the follower with its magnet, motor, gearing, etc. is intended to be substantial.

Instead of a freely rotatable collar supported on a ball-bearing, balls or rollers bearing directly on the underlying surface could be employed. An illustration of this is given in Fig. 7, where a thrust-ball 82 is held in a recess of an extension of the shaft 33. In this particular case, reduction of the frictional drag is alone contemplated.

The operation of the apparatus and of the new magnetic follower have been explained in connection with the description of the parts and their relations. It will be understood that the construction and arrangement may be varied in numerous particulars. The invention is applicable to the cutting or welding of metals with oxy-fuel-gas torches or by other methods, and may be applied to still other purposes.

We claim:

1. A follower for template-controlled apparatus having two oppositely driven magnetic template rollers to cooperate at different times with internal and external template walls, respectively, said template rollers having driving shafts disposed one within the other, and means for driving said shafts in opposite directions.

2. A follower for template controlled apparatus having two coaxial template rollers, and means for applying power to each of said rollers so as to drive them in contrary directions.

3. A follower for template controlled apparatus having two magnetic template rollers one above the other, a shaft passing through the upper roller and carrying the lower roller, a common source of power, and gearing between said source, said upper roller and said shaft to drive the rollers in contrary directions.

4. A follower for template controlled apparatus having two template rollers to cooperate at different times with internal and external template walls, respectively, said rollers being on driving shafts disposed one within the other, means for driving said shafts and rollers in contrary directions, and common electromagnetic means for magnetically energizing both rollers.

5. A follower for template controlled apparatus comprising an electromagnet having a polar portion which includes two coaxial template rollers, and means for driving said rollers in contrary directions.

6. A follower for template controlled apparatus comprising a hollow shaft forming a template roller, an inner shaft passing through said hollow shaft and bearing another template roller, and means for driving said shafts and rollers in contrary directions.

7. A follower for template controlled apparatus comprising a hollow shaft forming a template roller, an inner shaft passing through said hollow shaft and bearing another template roller, a magnetizing coil surrounding said shafts, and means for driving said shafts and rollers in contrary directions.

8. In a follower for template controlled apparatus, an electromagnet having a head, a casing and a core, all of magnetic material, two shafts one within the other in the core, magnetic template rollers at the ends of said shafts, and means for driving said shafts and rollers in contrary directions.

9. The combination of a torch-carrying frame affording universal movement in a plane, and a magnetic template follower connected with said frame and having template rollers one above another, with means for driving said rollers in contrary directions.

10. The combination with a movable frame, of a magnetic template follower comprising a magnet, two template rollers one above the other, a motor and gearing for driving said rollers in contrary directions, and a collar free to turn relatively to both rollers whereby the weight of the follower will rest on an underlying template, and a mounting for the follower connecting the latter with the frame in a manner permitting the follower to float in relation to the frame.

11. The combination with a movable frame, of a mounting on said frame, an electromagnetic follower having a body free to float vertically on said mounting and a motor-driven electromagnetic template roller part rotatable in said body, and a collar free to turn relatively to both said body and said template roller part while resting the weight of the follower unit on an underlying template.

12. The combination with a movable frame, of a mounting on said frame, a motor-driven electromagnetic follower free to float vertically on said mounting, and antifriction means for resting the weight of the follower unit on an underlying surface.

13. Template means for guiding a magnetic follower which has two magnet rollers driven in opposite directions, said means comprising an external template adapted to cooperate with one of the rollers for part of the prescribed course of the follower and an internal template to cooperate with the other roller for another part of the course.

14. A template of magnetic material having internal and external surfaces with portions relieved to insure contact at specific regions, and non-magnetic insertions to insure uninterrupted motion from one operating surface to another for the purpose of changing direction.

15. In template controlled apparatus, the combination of an electromagnetic template follower having upper and lower magnet rollers on shafts disposed one within the other and means for driving said shafts and rollers in opposite directions, and template means comprising an external template adapted to cooperate with one of the rollers for part of the prescribed course of the follower and an internal template to cooperate with the other rollers for another part of the course.

JAMES L. ANDERSON.
FRED E. ROGERS.